Patented Apr. 4, 1939

2,152,964

UNITED STATES PATENT OFFICE 2,152,964

DERIVATIVES OF HYDROCARBONS OF HIGH MOLECULAR WEIGHT AND PROCESS OF MAKING SAME

Walter Kern, Sissach, Switzerland, assignor to the firm of Society of Chemical Industry in Basle, Basel, Switzerland No Drawing. Application April 19, 1937, Serial No. 137,866. In Switzerland April 29, 1936

6 Claims. (Cl. 260—272)

This invention relates to the manufacture of derivatives of hydrocarbons of high molecular weight by causing an ortho-dicarboxylic acid anhydride of the general formula

in which R represents a radical selected from the group consisting of benzene and naphthalene, to act on a compound of the general formula

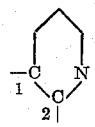

in which the pair of carbon atoms $C_1$ and $C_2$ are members of an angularly fused on tetranuclear hydrocarbon radical, which in addition to 6-membered carbon atom rings has at most one 5-membered carbon atom ring and is free from methylene groups.

To the compounds of the above general formula belong the pyrenolines, chrysenolines and fluoranthenolines.

As ortho-dicarboxylic acid anhydride may be used, for example, phthalic anhydride, 2:3-naphthalenedicarboxylic acid anhydrides or their substitution products which may contain for example halogens (chlorine or bromine), as well as nitro, alkyl or alkoxy groups.

The ortho-dicarboxylic acid anhydride is caused to react on the compounds of the above general formula at a high temperature in the presence or absence of an indifferent solvent or diluent, for instance nitrobenzene or trichlorobenzene and preferably in the presence of a condensing agent.

Suitable condensing agents are, for example, aluminium halides, for instance aluminium chloride or ferric chloride. These condensing agents may be used in the presence of an addition which lowers the melting point, for example an alkyl halide (sodium chloride or potassium chloride or a mixture thereof).

An extension of the invention consists in treating with an agent which affects substitution and/or condensation the product obtained, for instance with primary and secondary amines, a halogenating agent, for instance chlorine or bromine, nitrating agents, for example nitric acid, sulfuric acid, an aldehyde for instance formaldehyde; further valuable products may be obtained in that way.

The products may be purified by recrystallisation from solvents of high boiling points advantageously from nitrobenzene or trichlorobenzene or by conversion into their salts with strong acids, or by treatment with oxidizing agents, for instance alkali hypochlorite solution; they may be converted by known methods into the leuco derivatives, for instance, into the leuco-sulfuric acid ester.

The products of this invention are in part valuable intermediate products and in part dyestuffs; the latter may be used, for example, with dyeing and printing vegetable fibres, for example cotton. The dyeings and prints are very fast.

The following examples illustrate the invention, the parts being by weight; the ratio between parts by weight and parts by volume is that which exists between the kilo and the litre.

Example 1

30.6 parts of 3-pyrenoline made by the action of glycerine and sulfuric acid (98 per cent. strength) on 3-amoinopyrene at 130–180° C. in presence of nitrobenzene by the Skraup method, 144 parts of aluminium chloride and 72 parts of phthalic anhydride are intimately mixed and the mixture is baked at 135–140° C. After cooling the comminuted cake is introduced into dilute hydrochloric acid to remove the aluminium chloride and this mixture is boiled and filtered, and the residue on the filter is washed first with hot water and then with hot dilute sodium carbonate solution. The crude dyestuff thus obtained is crystallized from trichlorobenzene or nitrobenzene and slender red needles of melting point 340–350° C. are obtained; these dissolve in concentrated sulfuric acid to a green solution and dye cotton in a green-blue vat very fast red tints. The dyestuff may be supposed to be a monophthaloyl-3-pyrenoline of the formula

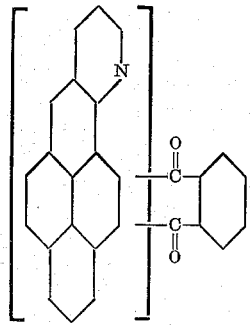

Example 2

128 parts of aluminium chloride, 30 parts of potassium chloride, and 20 parts of common salt are melted together at 112–117° C. and into the melt there is introduced in portions in the course of half-an-hour a mixture of 10.2 parts of 3-pyrenoline and 24 parts of phthalic anyhdride while stirring. The temperature is now raised to 165–170° C. and kept at this point for 7 hours. After cooling the cake thus obtained is introduced into dilute hydrochloric acid and the whole is boiled and filtered and the residue is washed with boiling water. For purification the dyestuff is extracted first with dilute sodium carbonate solution while warm and then with hot alcohol. It is a dark red powder which can be crystallized from trichlorobenzene or nitro-benzene and is probably identical with the phthaloylpyrenoline obtained as described in Example 1.

*Example 3*

10.2 parts of 3-pyrenoline are suspended in 200 parts of tetrachlorethane, 14 parts of aluminium chloride and 7 parts of phthalic anhydride are added and the whole is heated while stirring to 60–70° C. After stirring for 4 hours the temperature is raised to 92–96° C. and kept at this point for 16 hours, the mixture is then introduced into water and then distilled with steam to remove the tetrachlorethane. The whole is now filtered and separated from unchanged 3-pyrenoline by treatment with hot dilute sodium carbonate. The filtered sodium carbonate solution is acidified with dilute hydrochloric acid and filtered, the solid matter being washed with water and dried.

58 parts of the 3-pyrenolinoyl-ortha-benzoic acid thus obtained are intimately mixed with 40 parts of aluminium chloride and the mixture is baked for 20 hours at 135–140° C., and the dyestuff thus formed is purified as described in Example 1 and is identical with the phthaloylpyrenoline obtained in that example.

*Example 4*

5.1 parts of 3-pyrenoline and 9 parts of phthalic anhydride are together heated in 140 parts of trichlorobenzene at 150° C. whilst stirring and then 18 parts of aluminium chloride are introduced in portions in the course of half-an-hour at the same temperature. After further heating for 6 hours at 150° C. the reaction is complete, the whole is allowed to cool, filtered and the dyestuff freed from impurities by boiling it with dilute hydrochloric acid and sodium carbonate solution of 5 per cent. strength. After recrystallisation from trichlorobenzene or nitrobenzene there is obtained a red crystalline powder which dissolves in concentrated sulfuric acid to a green solution and dyes cotton in a blue-green vat fast red tints.

*Example 5*

20 parts of the monophthaloyl-3-pyrenoline obtained as described in Example 1, are suspended in 720 parts of nitrobenzene, some iodine is added and into the mixture are dropped 34 parts of sulfuryl-chloride in the course of 1 hour at 20° C. The whole is now heated to 62–66° C., kept at this temperature for 16 hours and finally stirred for 1 hour at 90–95° C. After cooling and filtering the solid matter is washed with benzene and alcohol and dried. This is the dyestuff which is purified by dissolution in concentrated sulfuric acid whereby hydrogen chloride is evolved and a red crystalline powder is produced which melts at 370–375° C., dissolves in concentrated sulfuric acid to a green solution and dyes cotton in a green-blue vat fast red tints.

*Example 6*

20 parts of the phthaloylpyrenoline obtained as described in Example 1, are suspended in 720 parts of nitrobenzene and into the suspension 36 parts of bromine are added by drops in the course of half-an-hour at 20° C. After adding some iodine the temperature is raised from 80–85° C. and kept at this point for 16 hours. The dyestuff is filtered and dissolved in concentrated sulfuric acid for purifying it, a portion of the bromine being evolved in the form of the hydrogen bromide, and the brominated monophthaloyl-3-pyrenoline being obtained in the form of a yellow-red crystalline powder which melts at 390–395° C., dissolves in concentrated sulfuric acid to a green solution and dyes cotton in a green-blue vat fast red tints.

*Example 7*

While cooling and stirring, 10 parts of phthaloylpyrenoline obtained as described in Example 1, are introduced into 225 parts of nitric acid of 96 per cent. strength at 10–15° C. and the mixture is stirred for 4 hours at the same temperature. This nitration mixture is diluted with ice-water and filtered and the solid matter is washed and dried. The nitrated phthaloyl-3-pyrenoline is a yellow powder soluble in concentrated sulfuric acid to a brown solution and dyes cotton in a green vat greenish-grey tints.

*Example 8*

7.6 parts of 3-pyrenoline, 20 parts of 3:6-dichlorophthalic anhydride and 40 parts of aluminium chloride are intimately mixed together and the mixture is baked for 16 hours at 160–165° C. After cooling, the comminuted cake is introduced into dilute hydrochloric acid and the whole is boiled and filtered and the solid matter is treated with hot water and with hot dilute sodium carbonate solution. For purification the dyestuff of the formula

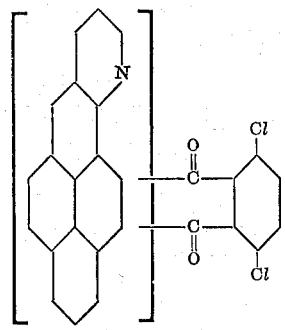

is crystallized from trichlorobenzene or nitrobenzene whereby the 3'-6'-dichloro-mono-phthaloyl-3-pyrenoline is obtained in the form of a red crystalline powder which dissolves in sulfuric acid to a green solution and dyes cotton in a green vat fast red tints.

*Example 9*

15 parts of 3-pyrenoline, 40 parts of 4-bromophthalic anhydride and 80 parts of aluminium chloride are intimately mixed together and the mixture is maintained at a temperature of 140–145° C. for 20 hours. After cooling, the comminuted cake is introduced into dilute hydrochloric acid to separate the aluminium chloride and the mixture is boiled, filtered and the solid matter washed. This crude dyestuff is purified by treatment with hot dilute sodium carbonate solution and subsequently by boiling with alcohol; it is then recrystallized from trichlorobenzene in presence of animal charcoal. The 4'-bromo-monophthaloyl-3-pyrenoline thus obtained of the formula

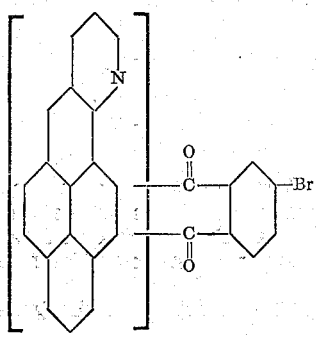

forms red needles of melting point 330–340° C. which are soluble in sulfuric acid to a green solution and dye cotton in a blue-green vat fast bluish-red tints.

*Example 10*

10 parts of the bromophthaloylpyrenoline obtained as described in Example 9 are suspended in 480 parts of nitrobenzene, some iodine is added and in the course of half-an-hour at 20° C. 17 parts of sulfuryl chloride are added by drops. To hasten the reaction the temperature is raised in stages, being stirred for 16 hours at 62–66° C. and 1 hour at 90–95° C. After cooling, the dyestuff is filtered and reprecipitated from concentrated sulfuric acid. It is a red crystalline powder soluble in concentrated sulfuric acid to a green solution; it melts at 295° C. and dyes cotton in a blue-green vat red-blue tints.

*Example 11*

13 parts of the bromophthaloylpyrenolene obtained as described in Example 9 and 10 parts of 1-aminoanthraquinone are suspended in 300 parts of nitrobenzene. After adding 8 parts of cuprous chloride and 10 parts of anhydrous sodium acetate the temperature is raised at 200–220° C. and the mixture is stirred at this temperature for 5 hours. The mass is filtered hot and the solid matter washed with nitrobenzene, benzene and alcohol and then boiled with hydrochloric acid of 3 per cent. strength. For purification the dyestuff of the formula

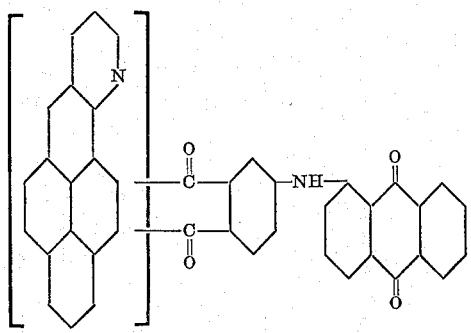

is recrystallized from α-chloronophthalene, whereby a black-red powder of melting point 400–410° C. is obtained; this dissolves in concentrated sulfuric acid to a blue-green solution and dyes cotton in a green-olive vat very fast Bordeaux tints.

Instead of 1-aminoanthraquinone there may also be used other aminoanthraquinones, dyestuffs having similar properties being obtained thereby.

*Example 12*

13 parts of the bromophthaloylpyrenoline obtained as described in Example 9, 18 parts of 1-amino-4-benzoylamino-anthraquinone, 16 parts of dry anhydrous sodium acetate and 12 parts of cuprous chloride are together suspended in 720 parts of nitrobenzene and the suspension is stirred for 5 hours at a temperature of 200–220° C. The whole is then filtered hot and the solid matter is washed with nitrobenzene, alcohol and benzene and then boiled with hydrochloric acid of 3 per cent. strength. The dyestuff of the formula

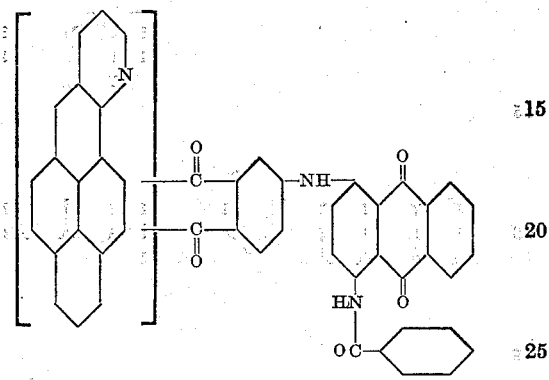

forms a black-violet powder which melts at 380–390° C., dissolves in sulfuric acid to a green solution and dyes cotton in an olive vat very fast violet tints.

If 1-amino-5-benzoylaminoanthraquinone is substituted for the 1-amino-4-benzoylaminoanthraquinone, a dyestuff having similar properties is obtained thereby.

*Example 13*

20 parts of the dyestuff obtained as described in Example 11 are introduced into a mixture of 300 parts of pyridine and 200 parts of aluminium chloride and the mixture is heated for 2 hours at 170–180° C. After cooling, the cake is extracted with boiling water and dilute hydrochloric acid and filtered. The new dyestuff is a brown powder soluble in concentrated sulfuric acid to a blue-green solution and dyeing cotton in an olive-green vat brown tints.

*Example 14*

5.6 parts of 2-chrysenoline made by the Skraup synthesis, 24 parts of aluminium chloride and 12 parts of phthalic anhydride are mixed intimately together, and the mixture is baked for 16 hours at 138–144° C. After cooling, the comminuted cake is introduced into dilute hydrochloric acid and the mixture is boiled, filtered, extracted with boiling water and treated with dilute hot sodium carbonate solution. For purification the dyestuff of the formula

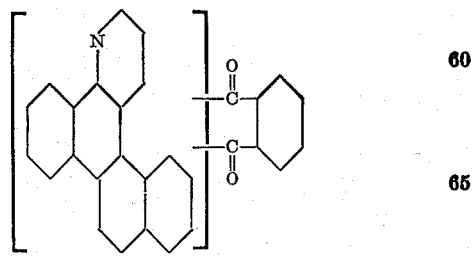

is recrystallized from nitrobenzene, a brown powder being obtained which dissolves in concentrated sulfuric acid to a wine-red solution and has a melting point of 275–280° C. and dyes cotton yellow tints in a wine-red vat.

What I claim is:—

1. Process for the manufacture of derivatives of hydrocarbons of high molecular weight, consisting in causing ortho-dicarboxylic acid anhydrides of the general formula

in which R represents a radical selected from the group consisting of benzene and naphthalene, to act on compounds selected from the group consisting of 3-pyrenoline and 2-chrysenoline.

2. Process for the manufacture of pyrene derivatives, consisting in causing ortho-dicarboxylic acid anhydrides of the general formula

in which R represents a radical selected from the group consisting of benzene and naphthalene, to act on 3-pyrenoline of the formula

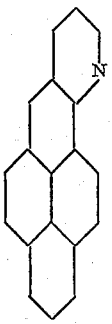

3. Process for the manufacture of pyrene derivatives, consisting in causing phthalic acid anhydride to act on 3-pyrenoline of the formula

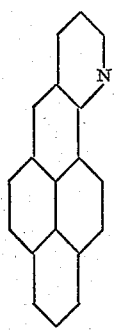

4. Derivatives of hydrocarbons of high molecular weight of the general formula

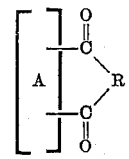

in which A represents a radical selected from the group consisting of 3-pyrenoline and 2-chrysenoline, and in which R represents a radical selected from the group consisting of benzene and naphthalene.

5. Pyrene derivatives of the general formula

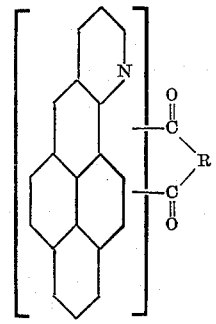

in which R represents a radical selected from the group consisting of benzene and naphthalene.

6. Pyrene derivatives of the general formula

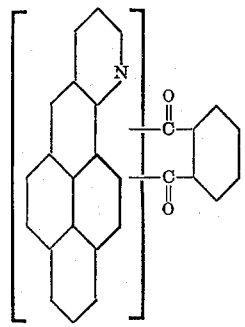

WALTER KERN.